(12) United States Patent
Aronsson et al.

(10) Patent No.: US 6,476,368 B2
(45) Date of Patent: Nov. 5, 2002

(54) SUSCEPTOR FOR HEATING A GARNISHED FLAT DOUGH IN MICROWAVE OVEN

(75) Inventors: Solveig Aronsson, Lund (SE); Katarina Wikström, Wallisellen (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/801,797

(22) Filed: Mar. 9, 2001

(65) Prior Publication Data

US 2001/0032843 A1 Oct. 25, 2001

(30) Foreign Application Priority Data

Mar. 10, 2000 (EP) ............................................ 00200867

(51) Int. Cl.⁷ ................................................ H05B 6/80
(52) U.S. Cl. ...................... 219/730; 219/735; 219/759; 426/118; 426/234; 426/243; 99/DIG. 14
(58) Field of Search ................................ 219/730, 728, 219/735, 759, 734, 732, 733; 99/DIG. 14; 426/241, 243, 234, 107, 118

(56) References Cited

U.S. PATENT DOCUMENTS

| | | | |
|---|---|---|---|
| 4,870,233 A | * | 9/1989 | McDonald et al. ......... 219/730 |
| 4,896,009 A | | 1/1990 | Pawlowski ............... 219/10.55 |
| 5,177,332 A | | 1/1993 | Fong ...................... 219/10.55 |
| 5,254,821 A | | 10/1993 | Walters .................. 219/10.55 |
| 5,278,378 A | | 1/1994 | Beckett .................... 219/728 |
| 5,352,465 A | * | 10/1994 | Gondek et al. ............ 219/730 |
| 5,585,027 A | * | 12/1996 | Young ..................... 219/730 |
| 6,251,451 B1 | * | 6/2001 | Zeng ...................... 426/107 |

FOREIGN PATENT DOCUMENTS

| | | | |
|---|---|---|---|
| EP | 0 943 558 | 3/1999 | |
| JP | 4-6792 | * 1/1992 | ................. 219/730 |

* cited by examiner

Primary Examiner—Philip H. Leung
(74) Attorney, Agent, or Firm—Winston & Strawn

(57) ABSTRACT

The invention relates to a susceptor for use as a support for heating food products such as garnished flat dough in a microwave oven. The susceptor includes a metallized plate that includes a plurality of apertures forming gas and microwave energy permeable areas that are evenly or randomly disposed in the peripheral area of the plate, with each aperture having a transverse dimension of at least about 5 mm. A ready to cook food article that includes such a susceptor and a food or dough product positioned thereon is also contemplated.

20 Claims, 2 Drawing Sheets

SUSCEPTOR FOR HEATING A GARNISHED FLAT DOUGH IN MICROWAVE OVEN

FIELD OF INVENTION

The present invention relates to a susceptor that thermally heats a food product such as a garnished flat raw dough disposed thereon when exposed to a microwave energy field and which improves the cooking, browning, and crisping of food products made of bread in a more natural manner close to the heating effect that is produced in conventional ovens.

BACKGROUND OF THE INVENTION

Microwave ovens often provide a quick and convenient way of cooking and heating food substances. A microwave oven typically heats food substances more quickly than a conventional oven even those using forced convection. The microwave energy heats the food product differently, however, from a conventional oven. In a conventional oven, the high temperature atmosphere impinges on the surface of the food product, causing the surface to heat first. Moisture is driven from the exterior of the food product by the hot oven atmosphere which results in both a progressive moisture evaporation at the surface of the product, and consequently, in a proper and homogeneous browning and crisping of the full product. The heat transfer takes place from the periphery to the center of the product by slow heat transfer mechanisms, especially conduction. As a result, the product can be made fully cooked in the middle and browned on the surface.

Heating in a microwave oven involves different phenomena. A microwave oven generates high intensity, high frequency electromagnetic radiation that penetrates into the food product. Heating occurs when the food product absorbs the electromagnetic energy. The wave absorption at the surface of the product is insufficient to provoke a superficial browning of the product. In addition, during the microwave heating, the moisture is also transferred from the interior to the exterior of the product due to the evaporation of the free water contained therein. In particular with dough-based products, the heating effects of microwave energy penetrate to a much greater depth toward the center of the food product than in the case of conventional heating. As a result, the middle of the food product will be heated much more quickly, while the surface will not be heated sufficiently to generate non-enzymatic browning reactions and to achieve desirable crispness. The problem of heating in microwave ovens is exacerbated in the particular case of frozen food products, such as frozen uncooked pizzas and the like. Frozen products comprise an amount of frozen water molecules and frozen fat molecules that is less sensitive to the microwave energy than the non-frozen part of the molecular system. As a result, the product has a tendency to heat in a non-homogeneous manner and zones of the product may frequently still be frozen while other parts are fully cooked.

In an attempt to overcome the drawbacks of microwave heating, susceptors have been developed which are usually added to the packaging of the food product. In the particular domain of garnished flat dough products such as pizzas, plate-like susceptors are known that are generally disposed underneath as a support for the dough which converts microwave energy into thermal energy. The thermal energy produces browning and crisping of the food item situated directly in contact with it. A typical susceptor includes a thin layer of microwave-interactive plastic such as aluminum deposited on a foodgrade plastic surface. Typically, a sheet of thick paper or cardboard further reinforces the susceptor bonded underneath, incidentally to confer sufficient rigidity to hold the food product.

U.S. Pat. No. 4,896,009 to Pawlowski ("Pawlowski") provides a susceptor for food items wherein the base laminate contains gas permeable means, such as holes, that are located in the immediate area of the center of the base laminate. Holes with an average diameter of ⅜ inch are produced to allow venting of gases and vapors to improve browning and crisping of the crust.

Several drawbacks remain, however, when heating an uncooked flat dough-type product such as a pizza or pizza-like product in a microwave oven. A pizza crust as obtained from a susceptor such as the one described in Pawlowski also looks undesirably burned underneath the rim of the dough, while the center of the dough looks relatively uncooked because of the presence of relatively large holes in there. It is believed that, although venting in the middle is well provided, the presence of large holes in the middle causes this region of the crust to heat less rapidly than at the edges that come more quickly to a sufficient degree of cooking. Therefore, the crust as obtained does not fit the normal standard of conventional pizza-type products that is required to gain widespread consumer acceptance.

A similar approach is described in European Patent Application No. 0943558 which describes an imperforate susceptor in which transparent microwave zones are provided in the central region of the susceptor. This approach differs from that in Pawlowski in that the transparent areas are preferably not gas permeable means, but rather are inactivated metallized areas or non-metallized areas of the susceptor. This solution is not well adapted to bake frozen raw dough as it does not solve the cracker-like texture of the rim, but even makes the heating still more unsatisfactory since, contrary to Pawlowski, the venting of the center part of the pizza is no longer obtained. If the water vapor cannot evacuate under the pizza, the crust becomes soggy and moist at the bottom. This undesirable phenomenon is further enhanced as the center has a plurality of areas that are non-reactive to the microwave field, which forms white crust areas with a soggy and soft texture.

U.S. Pat. No. 5,278,378 to Beckett describes a microwave heating element with circular openings therethrough and antenna means in at least some of the openings to guide microwave energy to and through the openings. The openings are provided uniformly along the entire surface of the heating element to affect a uniform heating of the product. The openings serve to guide portions of the microwave energy therethrough, and are, therefore designed specifically with inner structures such as small islands, peninsulas or continuous strips. This design is for uniform heating of a homogeneous foodstuff, but does not properly take into account the specificity of a garnished flat bread product, which is a difficult product to heat. Furthermore, it is well known that such structures may create undesirable sparks.

SUMMARY OF THE INVENTION

The invention relates to a microwave susceptor for heating food products such as garnished flat doughs in a microwave oven. This susceptor is advantageously in the form of a metallized plate having a plurality of apertures forming gas and microwave energy permeable areas, which apertures are disposed in an area disposed about a peripheral portion of the plate, with each aperture having a transverse dimension of at least about 5 mm.

In one embodiment, the plurality of apertures are confined on the metallized plate within a peripheral band having a predetermined width, whereas the rest of the plate is free from such apertures. The peripheral band preferably has a width of between about 5 mm to less than about 50 mm and the apertures are located between about 5 mm and about 20 mm from the nearest edge of the plate. In a preferred embodiment, the plate is disc shaped and has a diameter of about 200 mm to 230 mm.

In another embodiment, the plate includes a central area externally delimited by the peripheral band, the central area having a plurality of perforations each having a maximum transverse dimension of less than about 1.5 mm. Preferably, the perforations include slits having a length of at least about 10 mm.

In another embodiment, the plurality of apertures include regular polygonal shapes, or irregular polygonal shapes, or any combinations thereof. In a preferred embodiment, the plurality of apertures includes circular shapes, oval shapes, or both circular and oval shapes.

In yet another embodiment, the apertures have a length of between about 5 mm to about 15 mm and are distributed so as to have a distance of about 10 to 38 mm between each aperture. In still another embodiment, the plate includes a laminate including a receiving surface onto which the garnished flat dough can be pressed, the receiving surface comprising a food-grade, metallized plastic layer, and a rigid microwave-inert substrate that forms the lower surface of the plate adhesively attached to the receiving surface. Preferably, the microwave-inert substrate is a flat or corrugated material and is attached to the receiving surface by an adhesive. In a preferred embodiment, the corrugated material has a thickness of about 1 mm to 1.5 mm before it is corrugated.

The invention further relates to an article including a susceptor plate having a metallized plastic surface, and an uncooked food product located on the metallized plastic surface. Preferably, the food product is an uncooked dough, such as a garnished flat dough product comprising a substantially non-garnished dough rim and a garnished center. A plurality of apertures having transverse dimensions of at least about 5 mm are distributed within the susceptor plate within a peripheral band having a predetermined width, whereas the rest of the plate is free from such apertures, and wherein the flat dough product is disposed onto the plate so that the peripheral band substantially encompasses the limits of the non-garnished dough rim of the flat dough product.

In a preferred embodiment, the apertures each have a transverse dimension of about 5 mm to 15 mm and a length of up to 15 mm, the apertures being distributed so as to have a distance of about 10 mm to 38 mm between each aperture. In another embodiment, the width of the band is about 35 mm to 50 mm. In a preferred embodiment, the apertures cover about 8% to 15% of the surface area of the band, the apertures having surface areas of about 30 mm$^2$ to 40 mm$^2$ each. In another embodiment, the flat dough product is frozen and the flat dough product may be a pizza.

BRIEF DESCRIPTION OF THE DRAWINGS

For a better understanding of the present invention, reference should be made to the following detailed description taken in conjunction with the drawings, in which.

DETAILED DESCRIPTION OF THE INVENTION

Figure 1:
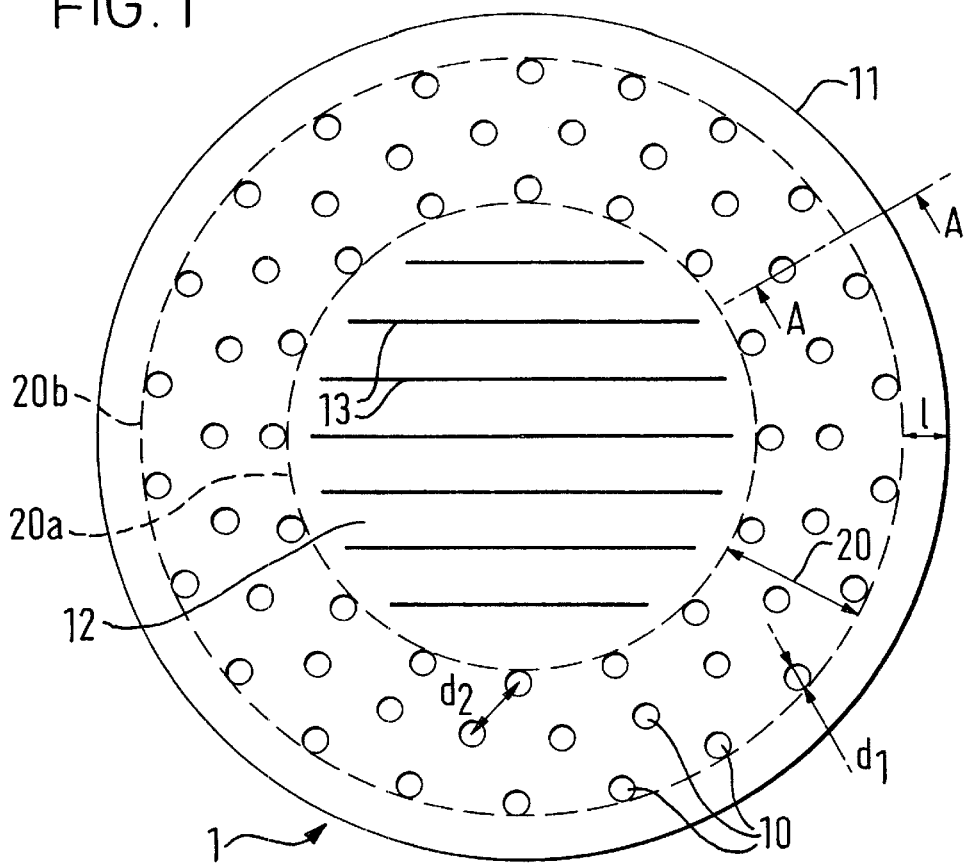
FIG. 1 is a top view of the preferred embodiment of the improved microwave susceptor of the invention.

Applicants have surprisingly found that certain uncooked food products, such as conventional dough, had a heating pattern that was not uniform along its bottom surface. Due in particular to the direct contact of the dough surface with the susceptor, which applies a relatively high burning effect by conduction, the dough experiences a relatively low rising, over-burning, and consequently a drying, particularly along the rim or edges of the crust. Without being bound by theory, it is believed that the region of the rim of the dough is spaced from the center of the dough by about half the wavelength and that both of these regions therefore, concentrate a larger amount of microwave energy than the region in-between. The problem is especially critical in microwave ovens having a single microwave inlet, but it is also present in microwave ovens having more than one microwave inlet. As a result of this uneven heating pattern, the bottom surface of the crust around the rim forms an excessively browned band that remains flat and hard with a texture similar to a cracker, as opposed to a pizza crust heated in a conventional oven where the rim has nicely risen and remains crispy at the surface but still relatively soft inside. Finally, we have found that consumers often give negative and severe judgements when they cannot properly bite into the rim or when they cannot cut the product with a knife because the rim is too hard and carton-like. Therefore, special attention is required to get consumers' acceptance and to bring the final texture closer to that of a traditional pizza-type product baked in a conventional oven.

The present invention solves these problems. In particular, one advantage of the invention is to provide a susceptor for use in microwave heating of a garnished flat raw dough product, such as an uncooked pizza or pizza-like product, that preserves, after heating in a microwave oven, the characteristics of a well-cooked, well-browned, and crispy product. The invention can advantageously improve the texture and appearance of the crust throughout the dough product. In particular, one potential benefit of the invention is the ability to obtain a properly raised, crispy, but well-developed internal sponge-like texture of the rim of the dough, which is similar in quality to a dough baked in traditional household ovens or pizzeria ovens.

The invention can also provide a susceptor for creating a naturally uneven browning of the garnished flat dough that looks similar to the results which may be obtained in conventional ovens.

The invention can also advantageously be sufficiently economical to be inserted as a part of the package in which a garnished flat dough is wrapped or packaged for sale.

This invention is an improvement over the typical microwave susceptor for use as a support for producing a garnished flat bread such as a pizza, by baking a pre-garnished raw dough in a microwave oven. The susceptor includes a metallized plate. The plate includes a plurality of apertures forming gas and microwave energy permeable areas, the majority of which are disposed evenly or randomly within the peripheral area of the plate, with each aperture having a transverse dimension of at least about 5 mm.

Tests have surprisingly shown that the susceptor of the invention promoted the rising of the crust rim, which was advantageously increased in relatively large proportions while conferring a relatively crispy surface and retaining a soft and easily chewable internal texture. Furthermore, it has been proven that a critical minimal transverse dimension is necessary to achieve the beneficial result. Without being bound by theory, it is believed that, due to the specific susceptor configuration, more microwave energy can be absorbed directly into the dough, while proportionally less is absorbed into the reactive layer of the susceptor, as the less reactive surface is left available in the region of the rim of the dough. This extra energy brought into the dough is used to promote a higher rising of the dough. Normally, when the dough is still raw, the dough has a foam-like structure with small, primarily spherical gas cells dispersed throughout the dough. During dough preparation, fermentation of the dough is carried out to promote the expansion of the gas cells. During microwave heating, the microwave energy absorbed carries on the gas expansion of the cells until the cells break due to the gelatinization of starch and the development of cross-links between starch and proteins, leading to a final setting of the dough structure. The rising effect during the baking develops an open sponge-like structure of the crust, which remains relatively soft inside. According to the susceptor of the invention, the average self-rising of the dough in the region of the edges can be increased up to 50% compared to prior art susceptors. Another beneficial effect that can be obtained is that, since less heating energy comes from the susceptor, the risk of the bottom of the rim becoming too dark and hard is reduced. Therefore, the rim tends to be only superficially brown without over-burning, which promotes crispness and preserves the natural flavor of the dough without charcoal taste. As a result, the cracker-like effect of the rims can be avoided and a general positive consumer perception of the final product can be advantageously obtained.

As used herein, "transverse dimension" generally refers to the dimension of each aperture as measured from its width as transversally extending across its longer length. The apertures can have any geometric shape. Circles or rounded apertures are preferred to avoid angular segments that could possibly create sparks that could damage the oven. The apertures might, however, also be ovals, regular or irregular polygons, such as squares or rectangles, or any other arbitrary shape. For instance, if a circle, the transverse dimension measured is its diameter. If a rectangle, the transverse dimension is its width. If an oval or lentil shape, the transverse dimension should be measured along its minor axis. The apertures allow a sufficient amount of microwave energy to be absorbed into the dough at the place of the apertures. Thus, the susceptor as a whole preferably inhibits or avoids over-absorption of energy at the rim or other parts of the dough likely to become overcooked. For instance, very narrow slots or slits would not be considered as suitable for the invention, irrespective of their longitudinal dimension. On the other hand, the apertures preferably have a maximum length of up to about 15 mm, more preferably about 5 mm to 15 mm, and most preferably less than about 10 mm, for essentially keeping a sufficient heating power of the susceptor on the ring of the crust for giving the browning effect. Similarly, the transverse dimension of the apertures as measured across their lengths is preferably about 5 to 15 mm. In one embodiment, the transverse dimension is about 6 mm to 12 mm. The optimum configuration of the apertures has been determined to be circular holes of about 6 mm to 8 mm, preferably about 7 mm in diameter. Larger holes give a good rising effect, but the browning is less than with smaller holes. Also, for a practical reason, as the dough is intended to be pressed onto the susceptor, there is a risk that the dough will enter the holes when they are too large, making the product more difficult to remove from the susceptor after microwave baking. The apertures are also distributed so as to respect a partition distance in the range of about 10 to 38 mm. In one embodiment, the partition distance is about 15 mm to 30 mm. By "partition distance," it is meant the distance that separates two adjacent apertures in all possible directions as measured from the center of the apertures. It has been found that a decrease of the distance between the apertures gives less browning and vice versa. The optimum partition distance has been determined to be about 15 mm to 25 mm, preferably about 18 mm to 20 mm, and more preferably about 19 mm. It has also been determined that apertures having a transverse dimension less than 5 mm would not allow the crust to rise properly, irrespective of the distance between them. In other words, an increase of the concentration of smaller holes below the area of the rim of the dough would not confer the surprising rising effect that is sought.

Preferably, the plurality of apertures is confined to the peripheral area of the plate as more particularly demarcated within a band having a predetermined width, whereas the rest of the plate is free from such apertures. Indeed, contrary to the teaching of the prior art, we believe that relatively large apertures are desired along a band as defined above in order to promote the rising of the rim of the crust, but conversely these large apertures are not as suitable in a more centrally distributed location of the plate corresponding to the garnished central region of the product when installed thereon. Large apertures would reduce the heating power of the susceptor at the bottom of the bread under the garnishing and would undesirably enhance the variation of cooking degree between the center and the edges of the dough. More particularly, the risk is that at the time the edges are fully raised and brown, the center is still insufficiently cooked and still white.

The peripheral band of the susceptor preferably has a maximum width of about 5 mm to 50 mm or less, more preferably less than about 35 mm to 45 mm, and most preferably less than about 40 mm, and is at least 5 mm and generally about 5 mm to 20 mm, preferably about 13 mm to 17 mm, more preferably about 15 mm, from the nearest edge of the plate. The band as determined thereby takes into account the average dimension of the rim of the flat dough product that is intended to be pressed thereon. In general, it has been determined that for medium range garnished flat breads, such as pizzas, the rim represents about 8 to 25 mm, more preferably about 10 to 15 mm of the dough without garnish. Therefore, at the time of the production, the dough product will be pressed onto the susceptor and garnished in such a way as to leave a dough rim of that size within the limits of the band as defined above. The dough rim will be placed so that the peripheral band of the susceptor totally encompasses the rim and preferably also further extends a short distance inward under the garnished part of the dough (about 5 mm to 20 mm). The geometry of the susceptor will preferably match the geometry of the flat bread, while the dimension of the susceptor may slightly extend outward up to about 10 mm to 15 mm beyond the contour of the bread. Such uncovered free portion adjacent the edge of the susceptor is useful to maintain the susceptor in place after the removal of the pressing tool, i.e., the pressing head that is used to press the dough ball onto the susceptor. It also allows the product to be handled by the consumer more easily without touching the dough. The preferable form of the susceptor is a disc, but other possible shapes are possible, such as squares or polygonal shapes as desired. Discs having a diameter of about 200 mm to 230 mm, preferably about 215 mm to 225 mm, more preferably about 220 mm are desirable to fit with flat dough products of about 180 mm to 210 mm or smaller, which typically meets the medium size pizza range, yet still provides a suitable rim as described herein. Theoretically, larger susceptors, as well as consequently larger or smaller food products, could also be envisaged, but the problem with larger products is that household microwave ovens have heating cavities that could be too small to receive them in one piece.

While the rim of the crust is allowed to rise properly there is still a need, however, to avoid allowing the center part or the garnished part of the product to become soggy because of a lack of moisture evacuation.

Consequently, in one preferred embodiment, the plate includes, in the central area as externally delimited by the aforementioned peripheral band, a plurality of perforations to allow the water vapor and gases to escape while allowing the microwave reactive layer to perform both the crispening and browning functions. The perforations, however, should preferably have a maximum transverse dimension of less than about 1.5 mm, more preferably less than about 1 mm, irrespective of their total length, which can be of any size. Suitable perforations are slits or small holes. Slits are preferred because the dough flows easier over the slits during the pressing of the dough onto the susceptor. Therefore, the dough has less tendency to enter into the perforations and the removal of the baked product is facilitated. In addition, since the degree of browning is less in the garnished part (except in the center point), comparatively more susceptor material is needed to properly brown the dough in this area. The slits can preferably be arranged in parallel arrays of slits with each individually having a length of at least about 10 mm, preferably at least about 30 mm, and more preferably at least about 50 mm. The slits could also encompass a wide range of shapes, such as a chevron or zigzag shapes, or others. The slits may be obtained, for example, by cutting through the susceptor without removing the material, thus making the width as small as possible and generally equal to the width of the cutting tool.

In a preferred embodiment of the invention, the susceptor, such as a plate, is constituted of a laminate including a receiving surface onto which the raw dough is pressed before it is garnished, the receiving surface having a food-grade, metallized plastic layer. The plastic may be any heat resistant plastic, such as a polyester plastic film. The plastic layer can be about 5 $\mu$m to 20 $\mu$m thick, preferably about 10 $\mu$m to 15 $\mu$m thick, and more preferably about 12 $\mu$m thick. Special surface treatments of the film can make removal of the dough easier after the baking as will be readily available to those of ordinary skill in the art. The metallization of the receiving surface is made on the inner side of the plastic film by deposition of a thin shielding layer of dielectric material.

The plate is further constituted of a bottom support forming the lower surface of the plate that is adhesively attached to the receiving surface and which includes a comparatively more rigid, microwave-inert substrate. The substrate can also function to insulate the susceptor bottom from the calorific loss, in particular from the heat-sink effect that is produced from the bottom glass tray of the microwave oven. A significant reduction of the heat-sink effect can be obtained when the substrate includes a corrugated material, such as a board. The disadvantage of a corrugated material, however, is that it has a tendency to be permanently compressed during the pressing operation of the dough onto the susceptor. The thicker the corrugation, the bigger the potential problem. Moreover, depending on the size of the apertures, the dough may have a tendency to go into the apertures and consequently into the corrugations, thus making the final product more difficult to remove after baking. Therefore, we have determined a range of thickness of the corrugated material that reduces the risk of compression while still proving to be effective in decreasing the undesirable heat-sink effect. The corrugated material preferably has a thickness of about 1 mm to 1.5 mm before it is corrugated. Of course, another substantially rigid support may also be used to replace the corrugated material, such as a simple plate-like cardboard or paperboard. The substrate must, in any event, be suitable for use in a microwave.

The invention also encompasses a combination of a susceptor plate and a dough product arranged thereon, such as a frozen garnished flat raw dough product. The susceptor plate has a metallized plastic surface onto which is laminated, for example, frozen garnished flat dough product. The garnished flat dough product can include a substantially non-garnished dough rim and a garnished center, characterized in that a plurality of apertures having minimal transverse dimensions of at least about 5 mm are distributed within the susceptor plate within a peripheral band having a predetermined width. The rest of the plate is free from such apertures and characterized in that the flat dough product is disposed onto the plate so that the peripheral band substantially encompasses the limits of the non-garnished dough rim of the flat dough product.

Figure 2:
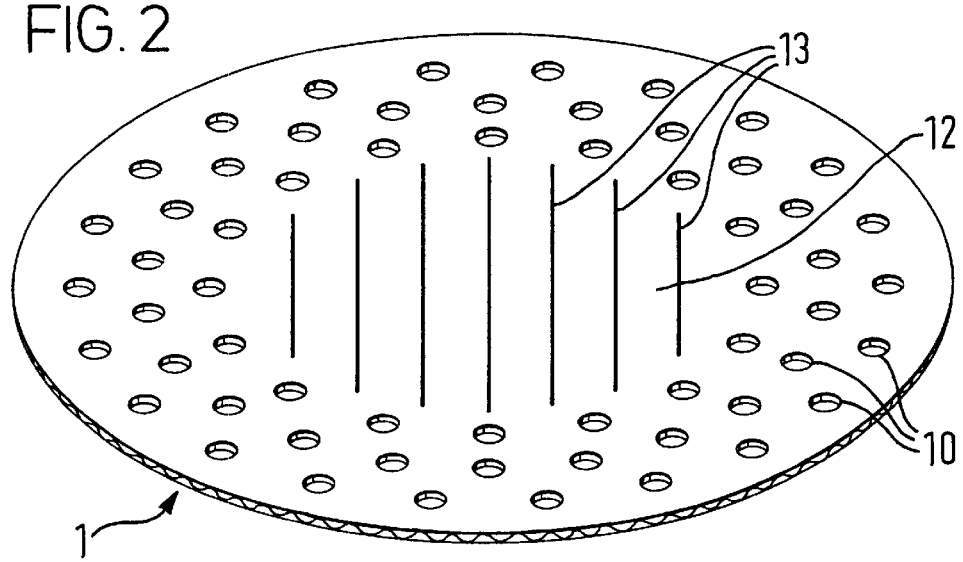
FIG. 2 is a perspective view of the susceptor shown in FIG. 1.

Referring to FIGS. 1 and 2, the susceptor 1 is preferably a disc-shaped plate that includes a plurality of apertures or holes 10 entirely circumscribed within a peripheral, preferably annular, band 20 of a predetermined width as referenced between dotted internal line 20a and external dotted line 20b. Optimum results have been obtained with circular holes 10 of a diameter $d_1$ of about 7 mm distributed along a band of 40 mm wide. The disc-plate had a diameter of about 220 mm adapted to receive a raw flat garnished dough, more specifically an uncooked pizza, of a diameter of about 200 mm after pressing and slight elasticity shrinking of the dough. The band was preferably separated from the outer edge 11 of the susceptor by a distance 1 of about 12 mm. The distribution of the holes was made along three concentric rows of holes. The holes were distributed so as to respect a partition distance $d_2$, as measured from the centers of the holes, in all dimensions of about 19 mm. The distance between the holes in each row was made different so as to create, after microwave baking, a substantially uneven browning effect close to a traditionally baked pizza. The number of holes was about 60 within the band. All of these parameters may be varied slightly by one of ordinary skill in the art depending on the size of the dough product, such as by 5% or even by 10%. It has been determined that the concentration of holes within the band area was optimal from about 8% to 15% surface coverage with each aperture having individual surface areas of about 30 mm$^2$ to 40 mm$^2$.

The center part 12 of the susceptor was perforated with a plurality of slits 13, organized in a transversal array while, the slits are about 15 mm from one another. The length of the slits ranged from about 50 to 110 mm in order to substantially cover the whole center part 12 of the susceptor, which had a diameter of about 120 mm. The slits were made by a cutting tool without significant material removal, just sufficiently to permit the gas and vapor to escape therethrough during the microwave heating. The slits were also configured thin so as to make the reflective layer of the susceptor capable of absorbing as much energy as possible transferred into thermal conductive heat to ensure a fall degree of cooking of the dough in the center part 12. Alternatively, the thin slits may also be cut in another suitable orientation, such as in intersection with each other or in a chevron shape. Very small perforations could also give satisfactory results, provided they have a maximum transverse dimension of up to about 1.5 mm.

Figure 3:
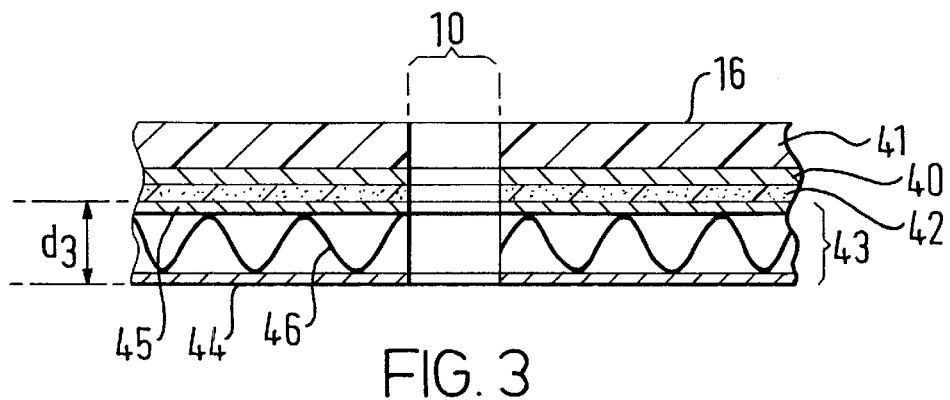
FIG. 3 is a cross sectional view of the susceptor of FIG. 1 along line A–A.

FIG. 3 illustrates a preferred structure for the susceptor. The susceptor can include a microwave-interactive layer 40 deposited on the internal surface of a plastic support layer 41. The support layer forms the receiving surface 16 for the dough and it is preferably a foodgrade sheet of siliconized PET, PTFE or any other suitable plastic of about 12 microns. The microwave-interactive layer 40 is a thin deposit of a metallic material, preferably aluminum, deposited by any suitable technique such as by vacuum deposition, vapor deposition, cathodic arc deposition, sputtering, or others. The deposited layer preferably has an optical density of about 0.1 to 0.35, preferably about 0.19 to 0.27. Preferably, a substantially rigid or semi-rigid base layer 43, which can be made of a corrugated board (as depicted) is provided. The base layer 43 can be glued to the metallized side 40 via an adhesive layer 42, such as a vinyl acetate co-polymer adhesive or any other suitable adhesive available to those of ordinary skill in the art. The corrugated board 43 depicted is mainly composed of a corrugated panel 46 that sandwiches between two thin flat cardboard panels 44, 45. It is important that the thickness $d_3$ of the corrugated board is less than about 3 mm, preferably about 1 mm to 1.5 mm, so as to prevent the risk of the board being permanently compressed during the pressing of the dough onto the susceptor's receiving surface 16. Corrugated board is a preferred material, as it reduces the heat sink effect with the microwave oven floor by providing an insulating barrier. The heat sink may cause non-uniform heating along the dough that could undesirably form large cold spots. The corrugated board helps ensure that no significant energy is drawn away to the floor, e.g., the bottom of the microwave. Other suitable supports may be used, however, such as flat cardboard or paperboard of sufficient thickness.

As is clearly apparent from FIG. 3, because of the presence of apertures 10 provided through the entire structure of the susceptor, the microwave energy absorption by the interactive layer is consequently decreased in these areas, thus leaving more energy available to be absorbed by the dough for generating a better rising of the dough with less browning. The apertures may be made after lamination of the susceptor by any suitable method known in the art, such as punching, calender rolling, or any other suitable technique. The apertures may be modified either in coverage, size, or shape, provided they remain within the aforementioned recommended characteristics.

Figure 4:
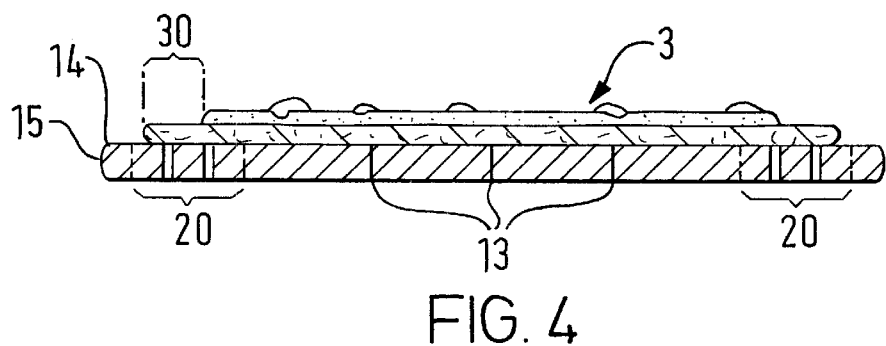
FIG. 4 is a diagrammatic cross sectional view of the combination of the susceptor and the garnished flat bread before microwave heating.

FIG. 4 shows the location of a garnished flat dough, more specifically a frozen raw pizza 3, when placed onto the susceptor. We have surprisingly discovered that there was an advantage in pressing the dough directly onto the susceptor. Indeed, the pressure applied during the pressing of the dough ball had a positive influence on the browning and crispness. In particular, pressures of about 30 to 90 bars, preferably about 50 bars to 80 bars, and more preferably about 70 bars, corresponding to the measured pressure on the hydraulic press, have given good results. More particularly, a more pronounced browning and improved crispness was obtained compared to a product placed onto the susceptor after having been separately laminated. Without being bound by theory, it is believed that a better contact is made during pressing between the dough and the receiving surface of the susceptor that would improve the conductive thermal transfers in the areas of contact with the dough.

The uncooked product is so pressed onto the susceptor and garnishing (e.g., sauce, cheese, spices, condiments, etc.) is applied thereon while leaving an ungarnished dough rim 30 of about 8 mm to 15 mm in width. The rim of the dough must necessarily be placed within the perforated band 20, while a small gap 14 (the rim) of several millimeters is preferably left free between the circular edge of the product and the edge 15 of the susceptor. This small gap may advantageously serve as a retaining area to maintain the susceptor in place on the conveyor line while the pressing head is removed from the sticking dough layer. The word "about," as used herein, refers to both numbers in a range.

EXAMPLE

A frozen pizza product was produced by mixing the following dough ingredients in a Kemper mixer for 1 minute at low speed and for 4 minutes at high speed:

| | |
|---|---|
| Flour | 56.8% by weight |
| Salt | 1.14% |
| Sugar | 1.14% |
| Baking powder | 0.57% |
| Inactive yeast | 0.17% |
| Baker's yeast | 2.82% |
| Margarine | 5.17% |
| Water | 32.19% |

The dough was then allowed to rest for 30 minutes at room temperature before it was divided into dough balls of about 170 grams. The balls were individually pressed directly onto susceptors using a Tomcat multi-press (Model MK 20).

The pieces of pressed dough were then allowed to proof again for 20 minutes to permit the cellular texture to recover. A thickness of raw dough of about 5 to 6 mm at the center and about 9.2 to 11.2 mm at the rim was obtained.

The next stage involved garnishing the dough with tomato sauce (Aw of 0.97 and pH of 4.2), cheese such as Emmenthaler type, vegetable cheese, ham, and spices. The garnishing of the dough can be made so as to leave a non-garnished rim of several millimeters. The invention is not limited, however, to a strictly non-garnished rim and the dough could also be slightly covered by tomato sauce and optionally cheese while leaving no visible uncovered rim around the pizza.

After garnishing of the dough, the pizzas, as laid onto the susceptors, were each transferred to be deep frozen in a deep freezing tunnel or freezing cells maintained at about −38° C. The combination was then shrink-wrapped and placed in a cardboard to closely maintain the susceptor and the product in the right place with no further risks of seeing the dough significantly move with respect to the susceptor.

The products as produced above were submitted to a microwave-baking test. The raw pizza was heated in a 750 watt microwave oven for about 390 seconds. The degree of rising of the rim of the pizza was comparatively measured to assess the importance of the apertured pattern in the susceptor of the invention depending upon varied parameters such as the number of rows, the diameter of the holes ($d_1$), and the partition distance ($d_2$) for the susceptor described above. The results are included in the following table:

TABLE 1

| | Number of Rows of Apertures | d₁ (mm) | d₂ (mm) | Rim Rise* (mm) |
|---|---|---|---|---|
| Prior Art | | | | |
| No holes | 0 | 0 | 0 | 5.7 |
| Invention | | | | |
| Example 1 | 2 | 6 | 1.9 | 6.08 |
| Example 2 | 3 | 6 | 2.5 | 6.3 |
| Example 3 | 3 | 6 | 1.9 | 6.9 |
| Example 4 | 3 | 7 | 1.9 | 8.5 |
| Example 5 | 2 | 10 | 1.9 | 7.47 |
| Comparative | | | | |
| Example 6 | 3 | 4 | 1.0 | 5.9 |
| Example 7 | 3 | 3 | 1.0 | 5.9 |

*Rim rise represents the variation of thickness between the final rim thickness after baking and the rim thickness of the frozen raw dough.

Figure 5:
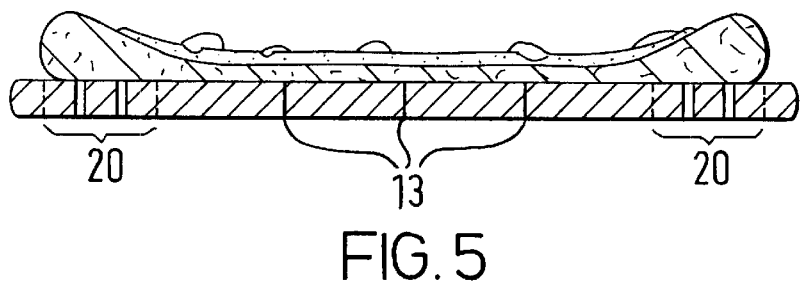
FIG. 5 is a view similar to FIG. 4 but after microwave heating.

FIG. 5 shows the combination of the invention after the heating has been completed. As a result of the heating operation, we noticed that the apertures within the band as defined above helped the browning by forming brown regions with a little fuzzy effect around the circles, thus making the rim look more natural in a manner similar to a conventional pizza product heated in a convection oven. The rim of the crusts in Examples 3–5 had a very nice swollen appearance and tasted soft in the middle but crispy on the surface. The center part of the crusts was well-cooked with no overburned regions and no apparent soggy areas. The center point (a circular surface of about 30 to 40 mm in diameter) of the dough looked a bit more brown than the rest of the center part as by construction. The distance between the brown edge and the center is believed to be about half a wave-length of conventional, household microwave ovens, so that more microwave energy concentrates toward the center of the cavity than in the intermediate regions.

It should be recognized that although the invention has found a direct satisfactory application for the microwave baking of frozen pizza products, the invention can be extended to other types of dough-based products that have a similar dough structure such as flamed pie, quiche Lorraine, or other types of garnished flat dough.

It will be understood that the claims are intended to cover all reasonable changes and modifications of the preferred embodiments of the invention, herein chosen for the purpose of illustration, which do not constitute a departure from the spirit and scope of the invention.

What is claimed is:

1. A microwave oven susceptor for supporting and baking food products comprising a plate having a metallized layer adapted to receive the food product and a plurality of apertures forming a gas and microwave energy permeable band of a predetermined width, wherein each aperture has a transverse dimension of at least about 5 mm, and wherein the apertured band is confined on the plate in an area adjacent the peripheral edge(s) of the plate, whereas the rest of the plate is free from such apertures.

2. The susceptor of claim 1, wherein the peripheral band has a width of between about 5 mm and 50 mm and the apertures are located from about 5 mm to 20 mm from the nearest edge of the plate.

3. The susceptor of claim 2, wherein the plate is disc shaped and has a diameter of about 200 mm to 230 mm.

4. The susceptor of claim 1, wherein the plate comprises a central area externally delimited by the peripheral band, the central area having a plurality of perforations each having a maximum transverse dimension of less than about 1.5 mm.

5. The susceptor of claim 4, wherein the perforations comprise slits having a length of at least about 10 mm.

6. The susceptor of claim 1, wherein the plurality of apertures comprise regular or irregular polygonal shapes, or combinations thereof.

7. The susceptor of claim 6, wherein the apertures have circular shapes, oval shapes, or both circular and oval shapes.

8. The susceptor of claim 1, wherein the apertures have a length of between about 5 mm to about 15 mm and are distributed so as to have a distance of about 10 to 38 mm between each aperture.

9. The susceptor of claim 1, wherein the plate comprises:

a laminate comprising a receiving surface onto which the food product can be positioned, with the receiving surface comprising a food-grade, metallized plastic layer; and a rigid microwave-inert substrate that forms the lower surface of the plate attached to the receiving surface.

10. The susceptor of claim 9, wherein the microwave-inert substrate is a flat or corrugated material and is attached to the receiving surface by an adhesive.

11. The susceptor of claim 10, wherein the corrugated material has a thickness of about 1 mm to 1.5 mm before it is corrugated.

12. An article comprising the susceptor of claim 1 and a unbaked dough product placed thereupon for baking in a microwave.

13. The article of claim 12, wherein the apertured band of the susceptor provides a rise in the baked dough product that is 50% higher than a susceptor without such an apertured band.

14. An article comprising:

a susceptor plate having a metallized plastic surface; and an uncooked food product having a peripheral band and being positioned on the metallized plastic surface of the susceptor plate;

wherein a plurality of apertures having transverse dimensions of at least about 5 mm are distributed within the susceptor plate within a peripheral band having a predetermined width, whereas the rest of the plate is free from such apertures, and wherein the food product is disposed onto the plate so that the peripheral band substantially encompasses the limits of the food product rim.

15. The article of claim 14, wherein the apertures each have a transverse dimension of about 5 mm to 15 mm and a length of up to 15 mm, the apertures being distributed so as to have a distance of about 10 mm to 38 mm between each aperture.

16. The article of claim 14, wherein the width of the band is about 35 mm to 50 mm.

17. The article of claim 16, wherein the apertures cover about 8% to 15% of the surface area of the band, the apertures having surface areas of about 30 mm² to 40 mm² each.

18. The article of claim 14, wherein the food product is a dough having a substantially non-garnished rim and a garnished center.

19. The article of claim 18, wherein the flat dough product is frozen.

20. The article of claim 19, wherein the flat dough product comprises a pizza.

* * * * *